US011157459B2

(12) United States Patent
Karampuri et al.

(10) Patent No.: US 11,157,459 B2
(45) Date of Patent: Oct. 26, 2021

(54) GRANULAR DATA SELF-HEALING

(71) Applicant: Red Hat, Inc., Raleigh, NC (US)

(72) Inventors: Pranith Kumar Karampuri, Bangalore (IN); Jeffrey J. Darcy, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 672 days.

(21) Appl. No.: 15/055,454

(22) Filed: Feb. 26, 2016

(65) Prior Publication Data

US 2017/0249334 A1    Aug. 31, 2017

(51) Int. Cl.
  *G06F 16/182* (2019.01)
  *G06F 16/11* (2019.01)
  *G06F 16/13* (2019.01)
  *G06F 16/178* (2019.01)

(52) U.S. Cl.
  CPC .......... *G06F 16/1844* (2019.01); *G06F 16/11* (2019.01); *G06F 16/13* (2019.01); *G06F 16/178* (2019.01)

(58) Field of Classification Search
  None
  See application file for complete search history.

(56) References Cited

U.S. PATENT DOCUMENTS

| 5,990,810 A | 11/1999 | Williams | |
| 6,449,731 B1 * | 9/2002 | Frey, Jr. | G06F 11/1076 707/999.202 |
| 6,530,036 B1 * | 3/2003 | Frey, Jr. | G06F 11/20 714/6.31 |
| 7,373,472 B2 | 5/2008 | Bhasin et al. | |
| 7,519,736 B2 * | 4/2009 | Parham | G06F 11/0757 707/999.201 |

(Continued)

FOREIGN PATENT DOCUMENTS

| KR | 20030071245 A | 9/2003 |
| WO | 2007139647 A1 | 12/2007 |

OTHER PUBLICATIONS

Hackel, Kurt, "Oracle Cluster File, system on Linux, Version 2" Presentation for Oracle Corporation; 31 pages, downloaded from http://www.lugod.org/presentations/ocfs2/ocfs2_lug.pdf on Feb. 24, 2016.

(Continued)

*Primary Examiner* — Ashish Thomas
*Assistant Examiner* — Mellissa M. Ohba
(74) *Attorney, Agent, or Firm* — Lowenstein Sandler LLP

(57) ABSTRACT

A first storage server of the file system receives a request to perform an operation on the data file. The operation is to be performed on a first replica of the data file stored at the first storage server and a second replica of the data file stored at a second storage server of the file system. The first storage server configures first metadata associated with a first index file to indicate that the operation is to be performed on a first portion of the first replica. The first storage server determines the second replica is an outdated state indicating that the operation on the second replica has not been performed by the second storage server. In response to the second replica being in the outdated state, updating a first portion of the second replica identified in view of the first metadata and corresponding to the first portion of the first replica.

20 Claims, 7 Drawing Sheets

(56) References Cited

U.S. PATENT DOCUMENTS

| | | | | |
|---|---|---|---|---|
| 7,694,191 | B1* | 4/2010 | Bono | G06F 11/004 |
| | | | | 714/48 |
| 8,055,613 | B1 | 11/2011 | Mu et al. | |
| 8,135,928 | B2 | 3/2012 | Ozdemir | |
| 8,645,335 | B2 | 2/2014 | Gupta et al. | |
| 8,650,161 | B1* | 2/2014 | Dasilva | G06F 16/78 |
| | | | | 707/690 |
| 8,706,833 | B1* | 4/2014 | Bergant | G06F 17/30215 |
| | | | | 709/214 |
| 8,874,626 | B2 | 10/2014 | Avati et al. | |
| 8,904,229 | B1* | 12/2014 | Veeraswamy | G06F 11/1088 |
| | | | | 714/6.2 |
| 8,943,031 | B2* | 1/2015 | Karampuri | G06F 17/30194 |
| | | | | 707/697 |
| 8,949,208 | B1* | 2/2015 | Xu | G06F 3/0689 |
| | | | | 707/698 |
| 9,152,686 | B2* | 10/2015 | Whitehead | G06F 11/1451 |
| 9,189,495 | B1* | 11/2015 | Hughes | G06F 16/128 |
| 9,317,508 | B2* | 4/2016 | Karampuri | G06F 17/30215 |
| 9,317,509 | B2* | 4/2016 | Karampuri | G06F 17/30215 |
| 10,031,917 | B2* | 7/2018 | Kumarasamy | G06F 11/16 |
| 10,095,506 | B2* | 10/2018 | Gopalapura Venkatesh | |
| | | | | G06F 8/65 |
| 10,120,868 | B2* | 11/2018 | Avati | G06F 16/134 |
| 10,409,697 | B2* | 9/2019 | Chen | G06F 16/2308 |
| 11,016,941 | B2* | 5/2021 | Avati | G06F 16/178 |
| 2004/0066741 | A1* | 4/2004 | Dinker | G06F 11/1662 |
| | | | | 370/216 |
| 2011/0153570 | A1 | 6/2011 | Kim | |
| 2011/0313973 | A1 | 12/2011 | Srivas et al. | |
| 2012/0158675 | A1 | 6/2012 | Gupta et al. | |
| 2013/0297969 | A1* | 11/2013 | Kim | G06F 16/182 |
| | | | | 714/15 |
| 2014/0006858 | A1 | 1/2014 | Helfman et al. | |
| 2014/0074798 | A1* | 3/2014 | Karampuri | G06F 16/11 |
| | | | | 707/689 |
| 2015/0066855 | A1* | 3/2015 | Avati | G06F 16/134 |
| | | | | 707/638 |
| 2015/0248434 | A1* | 9/2015 | Avati | G06F 16/184 |
| | | | | 707/615 |
| 2016/0055224 | A1* | 2/2016 | Shetty | G06F 11/1469 |
| | | | | 707/624 |
| 2017/0235762 | A1* | 8/2017 | Sharpe | G06F 8/65 |
| | | | | 707/827 |
| 2017/0235950 | A1* | 8/2017 | Gopalapura Venkatesh | |
| | | | | G06F 8/65 |
| | | | | 726/24 |

OTHER PUBLICATIONS

"Open VMS System Manager's Manual", Nov. 22, 1996, 10 pages, Digital Equipment Corporation, downloaded from http://www.mi.infn.it/~calcolo/OpenVMS/ssb71/6015/6017p076.htm on Feb. 24, 2016.

Kellabyte, "How memory mapped files, filesystems and cloud storage works", Kellabyte.com blog posting, Aug. 19, 2013, 11 pages, downloaded from http://kellabyte.com/2013/08/19/how-memory-mapped-files-filesystems-and-cloud-storage-works/ on Feb. 24, 2016.

"File-System Implementation", 19 pages, University of Illinois at Chicago, Department of Computer Science, College of Engineering, Course Notes, Operating Systems; downloaded from https://www.cs.uic.edu/~jbell/CourseNotes/OperatingSystems/11_FileSystemImplementation.html on Feb. 26, 2016.

Herrin II, Eric H. et al. "The Viva File System" Technical Report No. 225-93, University of Kentucky, Department of Computer Science, Oct. 1995, 27 pages, downloaded from https://www.researchgate.net/profile/Raphael_Finkel/publication/2816931_The_Viva_File_System/links/5411b27d0cf2b4da1bec6720.pdf on Feb. 26, 2016.

* cited by examiner

GRANULAR DATA SELF-HEALING

TECHNICAL FIELD

The present disclosure relates to a file system, and more particularly, to granular data self-healing of files in a file system.

BACKGROUND

Data may be stored as unstructured data, for example, in files and directories in a file system. A distributed file system is a client/server based system that allows clients to access and process data stored on storage servers as if it were on their own computer. A distributed file system may store multiple copies ("replicas") of a data file and/or directory on more than one storage server to help ensure that, in case of a failure such as hardware failure and/or system failure, the data in data file and/or directory is up-to-date and accessible.

DESCRIPTION OF DRAWINGS

The details of one or more implementations are set forth in the accompanying drawings and the description below. Other features and advantages will be apparent from the description, drawings, and claims.

DETAILED DESCRIPTION

Figure 1:
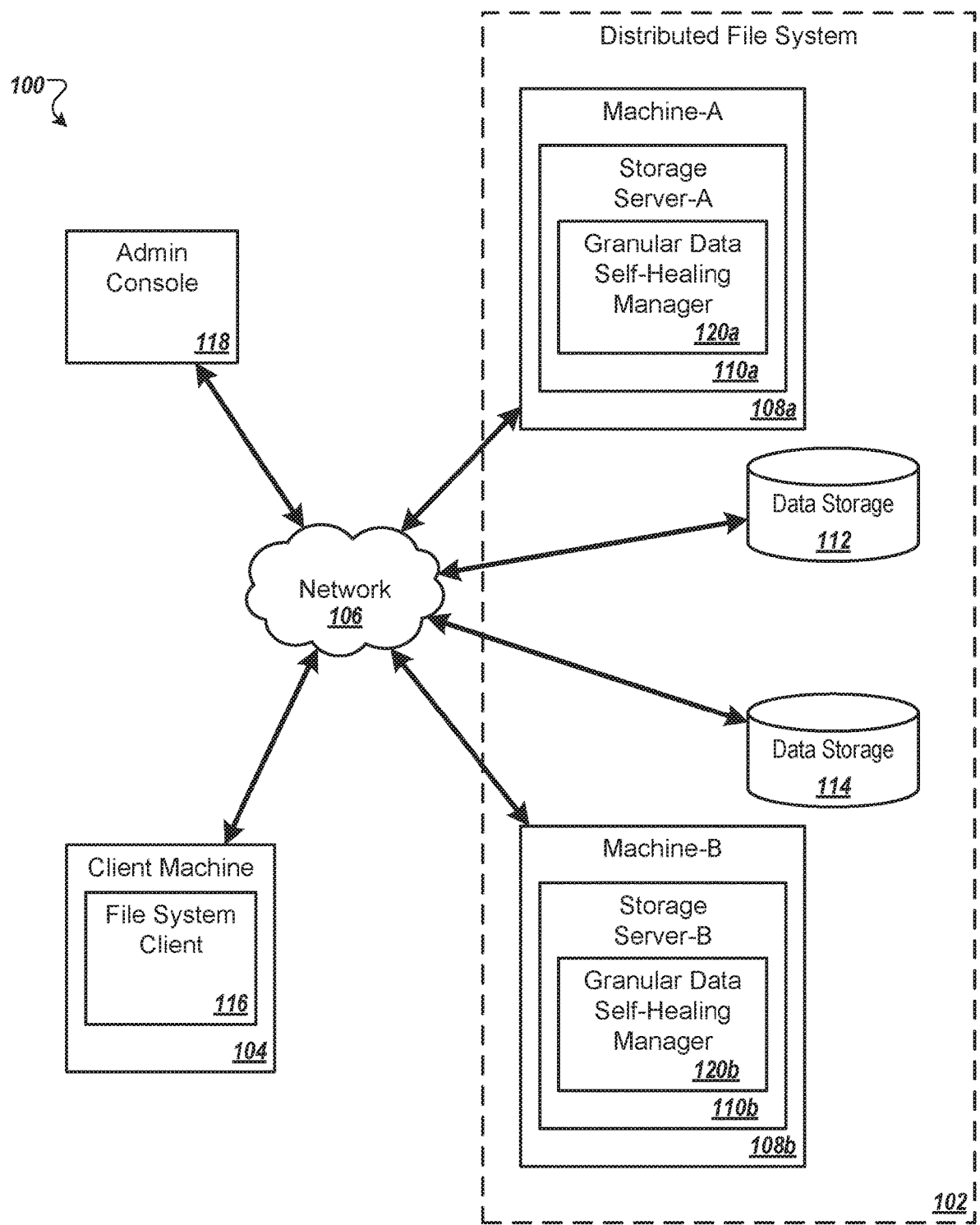
FIG. 1 is an example of system architecture, in accordance with various implementations.

A distributed file system may include several storage servers each storing a replica of a data file X (e.g., a virtual machine image file). For example, storage server A may store replica A of data file X, storage server B may store replica B of data file X, and storage server C may store replica C of data file X. If storage server B experiences a failure, for example, goes offline, then subsequently comes back online, changes made to replica A on storage server A as a result of an operation being performed on data file X while storage server B was offline may be propagated to replica B on storage server B. Replica B on the failed storage server B may be referred to as a target replica. Replica A (or replica C) may be in a current state (i.e., a state of a replica stored on the storage server that reflects that the operation (e.g., write, delete, add, or modify) was performed on the replica and the storage server has a current version of the replica) may be used for propagating changes to a target replica and may be referred to as a source replica. Because the target replica is in an outdated state (i.e., a state of a replica stored on a storage server that does not reflect that an operation was performed on the replica and that the storage server is storing an outdated version of the replica), the target replica should not be used as a source replica to update any other replica.

The propagation of changes from replica A to replica B may be performed by scanning large amounts of data to compare replica A in a current state (also referred to as current or current replica) with replica B in an outdated state (also referred to as outdated or outdated replica) and to determine the differences between the replicas. The determined differences may be propagated to the target replica to update the target replica to a current state. When the replicas are large files (e.g., a virtual machine (VM) image file consisting of 1 Terabyte (TB) of data or greater), scanning the large files takes considerable time, is resource intensive, and may lead to degradation of performance of associated VMs.

The present disclosure addresses the above-mentioned and other deficiencies by receiving a request to perform an operation on a data file and configuring, by a storage server, metadata associated with an index file to indicate that the operation is to be performed on specific portions of a replica of the data file stored at the storage server. If it is determined that another replica stored at another server is outdated, e.g., because the other server went offline, the metadata may be used to identify and update specific portions of the outdated replica without scanning entire files to determine which portions of the outdated replica are to be updated.

In one implementation, a client machine sends a request (e.g., operation request) to perform an operation on replicas of a data file. A data file may be a computer file that stores data. A replica may be a copy of the data file. Replica A of the data file is stored on storage server A and replica B of the data file is stored on storage server B. The operation request, which may be a system call, includes an indicator, such as an offset indicator and length indicator, used to identify bit ranges of the data file on which the operation is to be performed. The offset indictor may be a parameter (e.g., a starting bit) that identifies a starting point of the data file on which the operation is to be performed. The length indicator may be a parameter (e.g., X bits) that identifies the amount of data in the data file, beginning from the starting point, on which the operation is to be performed. Using the offset indicator and length indicator, the storage servers may determine the specific portions of the respective replicas of the data file on which to perform the operation.

The storage servers may keep a record of the portions of the replicas of the data file on which the operations are to be performed using index files and metadata associated with index files. An index file may be a logical representation of some or all of a data file. In one implementation, an index file is a computer file with associated metadata, such as extended attributes of the computer file. In some implementations, an index file may not store the actual data of the data file that the index file logically represents. An index file may logically divide the data file into multiple segments. The segments may be a fixed size, such as, for example, 4 Gigabytes (GB). The segments may be further logically subdivided into multiple portions. The portions may also be of a fixed size, such as 128 kilobytes (KB) portions of a 4 GB segment. In other implementations, the segments and/or portions may have other sizes. For example, storage server A may store a replica of a VM image file containing 1 TB of data. Storage server A may create one or more index files for the VM image file, each logically representing a 4 GB non-overlapping unique segment of the VM image file. 250 index files may be associated with the VM image file and logically represent the entire 1 TB VM image file. The index file may not contain the data of the VM file and may be an empty file. An index file may be associated with a unique identifier, such as a universally unique identifier (UUID), used to identify the index file and identify the segment of the VM image file that the index file logically represents. A UUID may be a value, such as an N-bit value, that is used to uniquely identify information. For example, the index file logically representing the first 4 GB of the replica of the VM image file may have a UUID of "GFID1" and the index file logically representing the second 4 GB of the replica of the VM image file may have the UUID of "GFID2", and so forth. It should be appreciated that although the index file may not contain data of the data file, in other implementations an index file may contain some or all of the data of the corresponding segment of the data file.

Metadata of an index file may be associated and/or stored with the index file and also contain arbitrary binary data. The metadata of an index file may be used to implement a bitmap. A bitmap is an array data structure used to compactly store bits. A bitmap stores kw bits, where w is the number of bits represented in a unit storage and k is a nonnegative integer. For example, for an index file that logically represents the first 4 GB segment of a data file, a bitmap of 31,250 bits may be implemented. Each bit of the bitmap may logically represent a 128 KB portion of the first 4 GB segment of the data file. The storage servers, using the metadata to determine the parts of the corresponding replica on which the operations are to be performed, may mark the bits of the bitmap of an index file to keep a lightweight record of the portions of the corresponding replicas on which the operations are performed. For example, if the first 128 KB portion of the first 4 GB segment of the data file is to be modified, a storage server may change the first bit of the bitmap of the first 4 GB index file from a logical "0" to a logical "1" to keep a record of the portion of the replica that is to be modified.

If during the operation on the replica of the data file, a storage server such as storage server B goes offline and is not able to perform the operation on replica B, replica B will become outdated. When server B comes back online, server B can begin self-healing. Self-healing may refer to the process of updating or repairing an outdated replica on a storage server to reflect the current state of the data file. For example, storage server A may have performed the operation on replica A making replica A current. Storage server A may determine that storage server B went offline and replica B is outdated. By comparing the metadata of the index files of storage server A with storage sever B, storage server A and/or storage server B may determine specific portions of replica B that are to be updated and make replica B current. The update may be performed on a granular level, i.e., identifying specific portions of outdated replica to repair or update without scanning or comparing substantially all or a majority of the current replica with the outdated replica.

FIG. 1 is an example of system architecture, in accordance with various implementations. The system architecture 100 can include a distributed file system 102 coupled to one or more client machines 104 via a network 106. The network 106 may be a public network, a private network, or a combination thereof. The distributed file system 102 can be a network attached storage file system that includes one or more machines 108A-B and one or more data stores 112 and 114, such as magnetic or optical storage based disks, solid-state drives (SSDs), or hard drives, coupled to the machines 108A-B via the network 106. The machines 108A-B can include, and are not limited to, any data processing device, such as a desktop computer, a laptop computer, a mainframe computer, a personal digital assistant, a server computer, a handheld device or any other device configured to process data.

The distributed file system 102 can store data as data files and can include directories, which are virtual containers within the distributed file system 102, in which groups of files (i.e., computer files and or data files) and possibly other directories can be kept and organized. The machines 108A-B can include storage servers 110A-B to manage the files and directories in the data stores 112 and 114. Data store 112 may be part of or associated with storage server 110A. Data store 114 may be part of or associated with storage server 110B. The data stores 112 and 114 can be one or more persistent storage units. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

One or more client machines 104 can include a file system client 116 to communicate with the storage servers 110A-B in the distributed file system 102. Examples of file system clients 116 can include, and are not limited to, native file system clients and network file system (NFS) clients. "Native" can describe support for specific operating systems. For example, a native file system client may be, and is not limited to, a file system client that supports the Linux operating system. The file system client 116 can mount the distributed file system 102 via a mount point to access the data in the distributed file system 102.

When the file system client 116 requests a data file from the file system 102, the file system client 116 may be directed to a specific copy (replica) of that data file on one of the storage servers 110A-B. Each storage server 110A-B can have a granular data self-healing manager 120A-B, respectively, to manage the processes described herein. In other implementations, client machine 104 may include a granular data self-healing manager (not shown) to perform some or all the processes described herein.

In one implementation, client machine 104 may initiate an operation on a data file associated with distributed file system 102 by sending a request to perform the operation (e.g., operation request) to distributed file system 102. The operation request directs storage server 110A to perform the operation on replica A of the data file stored in data store 112. The operation request directs storage server 110B to perform the operation on replica B of the data file stored in data store 114.

Granular data self-healing manager 120A-B, may each receive an indication of the operation request from client machine 104. Responsive to the operation request, granular data self-healing manager 120A may configure the metadata associated with an index file of replica A to indicate that the operation is to be performed on specific portions of replica A, and granular data self-healing manager 120B may configure the other metadata associated with another index file of replica B to indicate that the operation is to be performed on specific portions of replica B. By configuring the metadata of the index file of the respective replicas, granular data self-healing manager 120 may compare the metadata of a current replica with an outdated replica and update the specific portions and segments of the outdated replica based on the comparison.

If, for example, storage server 108B fails to perform the operation on replica B of the data file, granular data self-healing manager 120A may determine that replica B is in an outdated state. Granular data self-healing manager 120A may receive an indication from client machine 104 that storage server 110B went offline and replica B of the data file is outdated. When storage server comes back online, granular data self-healing manager 120A may compare the metadata of index files associated with current replica A with the metadata of index files associated with outdated replica B, to identify the specific portions of replica B that are to be update, and to update the specific portions of replica B using current replica A.

Figure 2A:
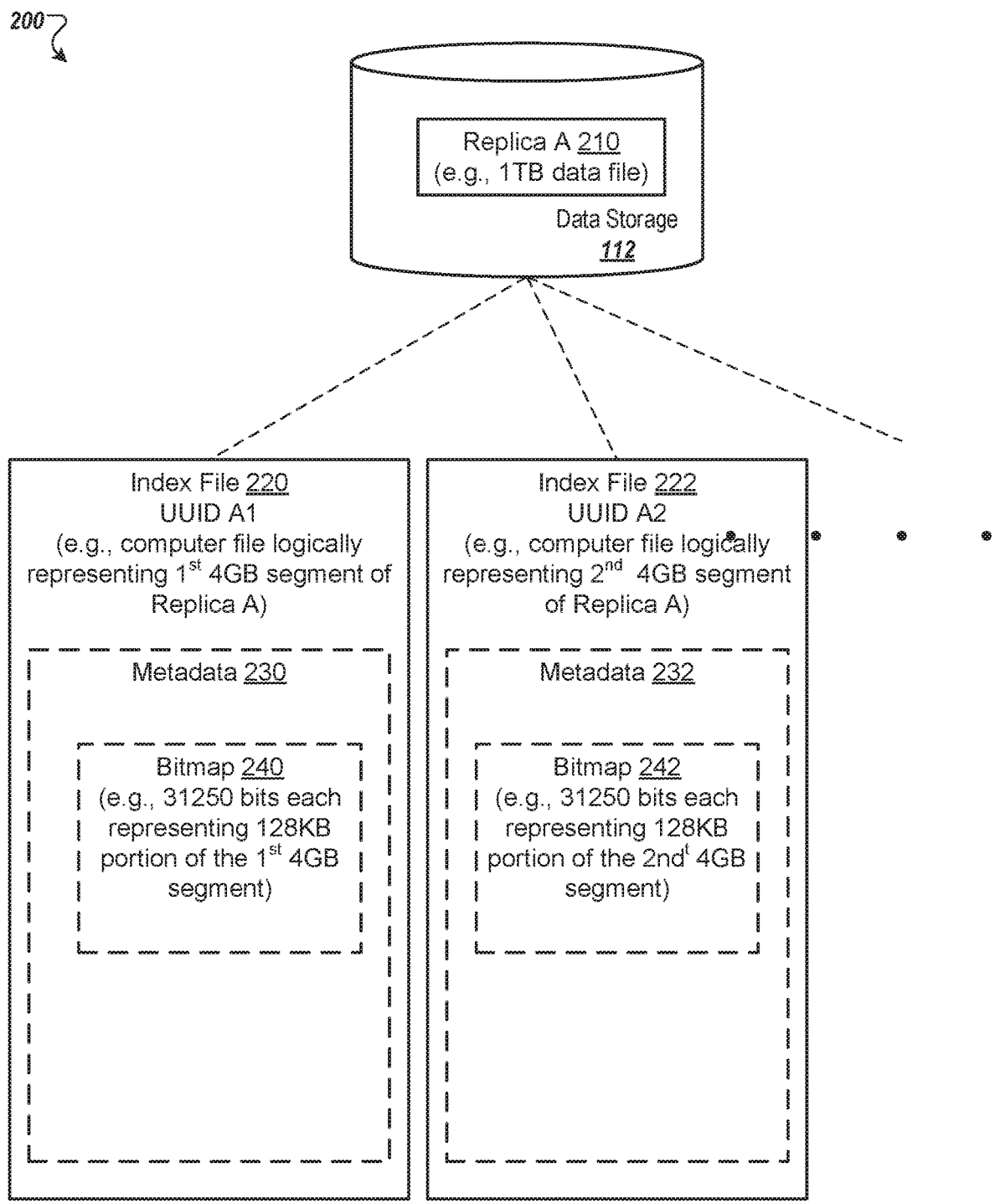
FIG. 2A is an example of an index file, in accordance with implementations.

FIG. 2A is an example of an index file, in accordance with implementations. System 200 includes data store 112. Data store 112 may be associated with storage server 110A of FIG. 1 and may contain a copy of a data file represented by replica A 210. In one example, replica A 210 is a 1 TB data file. Replica A 210 may have one or more associated index files, such as index file 220 and index file 222.

Granular data self-healing manager 120A may locate or create index files, such as index file 220 and index file 222. For example, client machine 104 may submit a request to perform an operation on a data file. The request contains an indicator (e.g., offset indicator and or length indicator) indicating the segments and portions of the data file on which the operation is to be performed. Storage server 110A may receive an indication of the request. In response to the indication of the request, granular data self-healing manager 120A of storage server 110A may locate the index files of replica A corresponding to the segments of the data file on which the operation is to be performed. Storage server 110A may locate the corresponding index files is distributed file system 102, for example in data store 112. If granular data self-healing manager 120A cannot locate one or more of the corresponding index files, granular data self-healing manager 120A may create the one or more index files. Granular data self-healing manager 120A may create index files in distributed file system 102. For example, the index file may be created in data store 112.

Index file 220 and index file 222 may be identified by an identifier, such as a file name or UUID. Each index file logically represents (e.g., does not contain that data of the data file) a segment of the data file. For example, replica A 210 may have a UUID of "A" (e.g., GFID-A). Index file 220 may have a file name that is derived from the UUID of replica A 210, such as "A1." Index file 220 is a computer file that logically represents the first 4 GB segment of replica A 210. Index file 222 may also have a file name that is derived from the UUID of replica A 210, such as "A2." Index file 222 is a computer file that logically represents the second 4 GB non-overlapping segment of replica A 210. Index file 220 and index file 222 may not actually contain the respective 4 GB of data, and may be empty files.

Index file 220 and index file 222 may have associated metadata 230 and metadata 232, respectively. In one example, metadata 230 and metadata 232 may be extended attributes that are associated with a computer file, such as index file 220 and index file 222. Metadata 230 and metadata 232 may be configured as a bitmap, such as bitmap 240 and bitmap 242, respectively. For example, bitmap 240 may include 31250 bits, where each bit represents a 128 KB portion of the first 4 GB segment. Bitmap 242 may include 31250 bits, where each bit represents a 128 KB portion of the second 4 GB segment.

The bits of the bitmap 240 and bitmap 242 may be modified to indicate the portions of the corresponding segment of replica A 210 that are to be modified in response to the operation request. For example, bitmap 240 and bitmap 242 may, prior to an operation request, start in an unmodified state (e.g., "0" for unmodified, and "1" for modified). In an unmodified state, all the bits of bitmap 240 and bitmap 242 are set to logical "0." In response to receiving an operation request, granular data self-healing manager 120A, locates the corresponding index file, such as index file 220, and modifies the bits of bitmap 240 to logical "1" to indicate the portion of the first 4 GB segment that are to be modified by the operation.

During a self-healing process, granular data self-healing manager 120A may repair replica B of storage server 110A using replica A 210. The self-healing process may be performed by looking at bitmap 240 and bitmap 242 to identify which portions of replica A 210 are different than replica B. Granular data self-healing manager 120A may propagate the differences to the respective portions of replica B. The repair process can be initiated automatically (e.g., when storage server 110B goes down and then comes back up, or when a client machine 104 requests a data file from a storage server and checks bitmaps of the data file's replica to see if the replica stored on that storage server is current), or upon a user request.

It should be appreciated that an index file may logically represent any a segment of a replica of any size. It should also be appreciated that in some implementations, the index files associated with a replica represent a fixed size (e.g., each index file logically represents a 4 GB segment of the replica). In other implementations, the index files associated with a replica may logically represent different sizes (e.g., first index file represents 4 GB, the second index file represents 8 GB, and so forth).

Figure 2B:
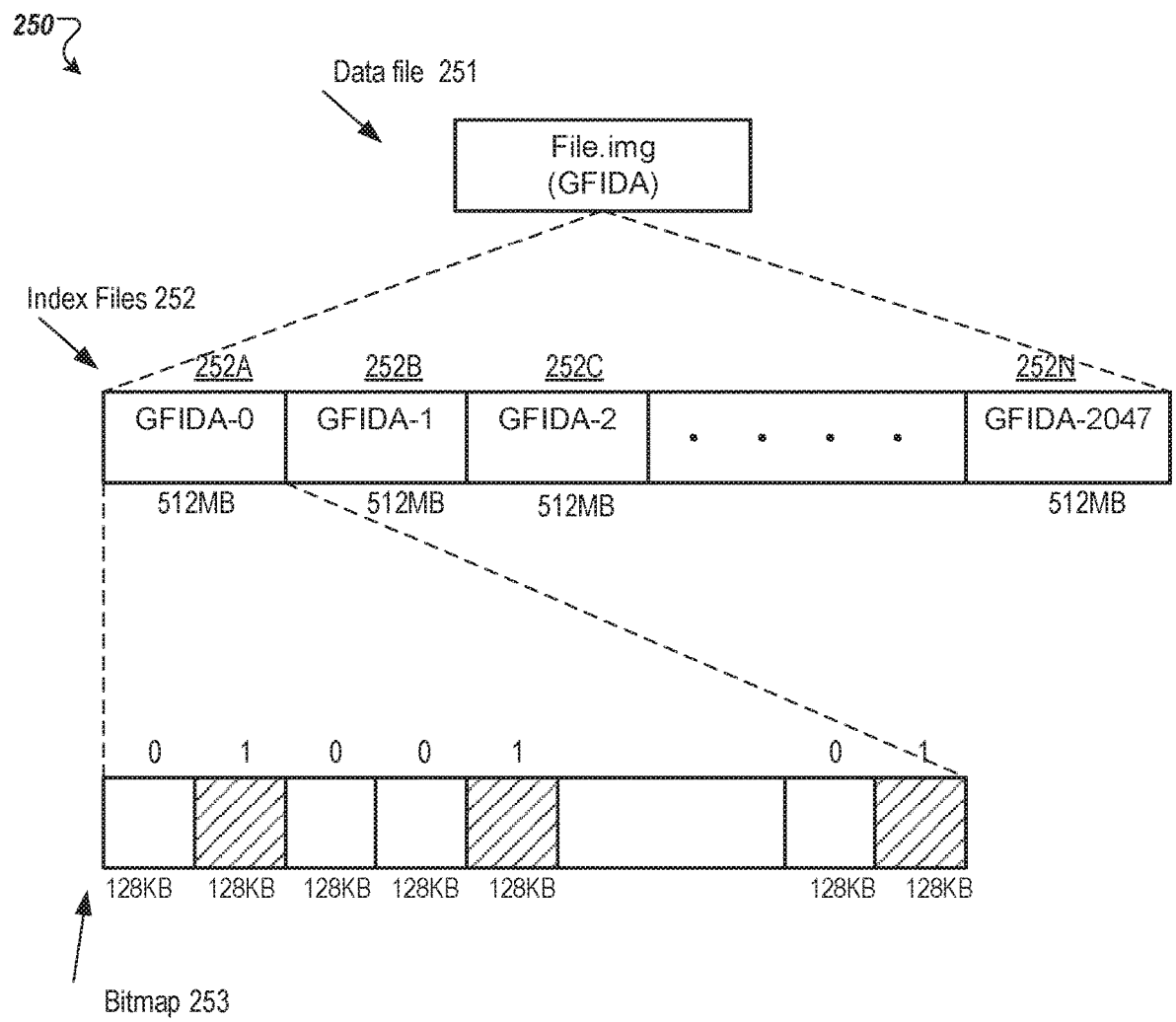
FIG. 2B is an example of an index file, in accordance with other implementations.

FIG. 2B is an example of an index file, in accordance with other implementations. System 250 includes data file 251 that may be stored, for example at data store 112 associated with storage server 110A of FIG. 1. Data file 251 may be large file, such as 1 TB or greater. Data file has the name "file.img" and a UUID of "GFIDA." Index files 252 include index file 252A with a name derived from the UUID of data file 251, such as "GFIDA-0". It should be appreciated that in some implementations, index files 252 may have a UUID derived from data file 251, or another type of identifier. Index file 252A logically represents a 512 Megabyte (MB) segment (e.g., logical shard) of data file 251. Index files 252 includes 2048 index files represented by index file 252B, 252C, to 252N. Index files 252 logically represent the entire data file 251, but do not actually split data file 251 into segments. Each index file 252 has a different name derived from the UUID of data file 251 and each index file 252 logically represents a 512 MB segment (e.g., logical shards) of data file 251. When an operation is performed on data file 251, changes to the logical shards are stored in a bitmap, such as bitmap 253. The bits of bitmap 253 may each logically represent a 128 KB portion of the 512 MB segment of the index file 252A. Bitmap 253 may include a number of bits (e.g., 4 kilobits)) representing the entire 512 MB logical shard. Bitmap 253 may be stored on or associated with an empty computer file, such as index file 252A, as an extended attribute. Each of the index files 252 may have a bitmap, similar to bitmap 253. Bitmap 253 illustrates logical "01001 . . . 01", where logical "1" represents the 128 KB portion of the logical shard that has been or is to be modified by the operation to data file 251, and where logical "0" represents the 128 KB portion of the logical shard that has not been modified by the operation to data file 251. Logical "01001 . . . 01" of bitmap 253 may be represented as a decimal number. The entire data file 251 (e.g. 1 TB data file) may be stored as a bitmap with granularity of 128 KB using the extended attributes of empty index files 252 (e.g., GFIDA-0, GFIDA-1, GFIDA-2, . . . , GFIDA-2047). In another implementation, the bitmap 253 may be stored in the contents of an associated index file, such as index file 252A, rather than or in addition to the extended attributes of an index file.

In another implementation, distributed file system 102 of FIG. 1 may include a mountable network file system (not shown) that may include one or more directories. The directories may be hidden or unhidden. Metadata of a directory or file may be stored with the directory or file. In one example, the mountable network file system includes an index directory (not shown) on the top-level (e.g., root) to store data file 251 and or one or more index files 252. Each index file 252 and or data file 251 may be stored using the UUID and or file name. The index directory may be used to keep track of a data file, such as data file 251, which is known to have pending or incomplete updates (e.g., operation is to be performed or operation was not performed).

In one implementation, per-operation counts may be used to keep track of a data file on which an operation is to be performed. The per-operation counts are associated with the data file and may be incremented before an operation (e.g., modifying operation) on the data file is performed and or may be decremented when the operation is completed successfully. For example, data file 251 may be smaller file, such as a 1 gigabyte (GB) file. Data file 251 may be divided into 8 segments of 128 MB. Each segment may be represented by a bit in a bitmap. Since data file 251 is a smaller size, the extended attributes of data file 251 (not shown), rather than an index file's extended attributes, may be used to implement a bitmap, similar to bitmap 253. The bitmap of data file 251 may be incremented responsive to the operation to be performed or decremented when the operation is completed successfully. The aforementioned implementation may be used with or separate from other implementation disclosed herein.

It should be appreciated that data file 251, index files 252, and bitmap 253 are provided for purposes of illustration and not limitation, and may be represent different size data file, segments, and or portions, respectively.

Figure 3:
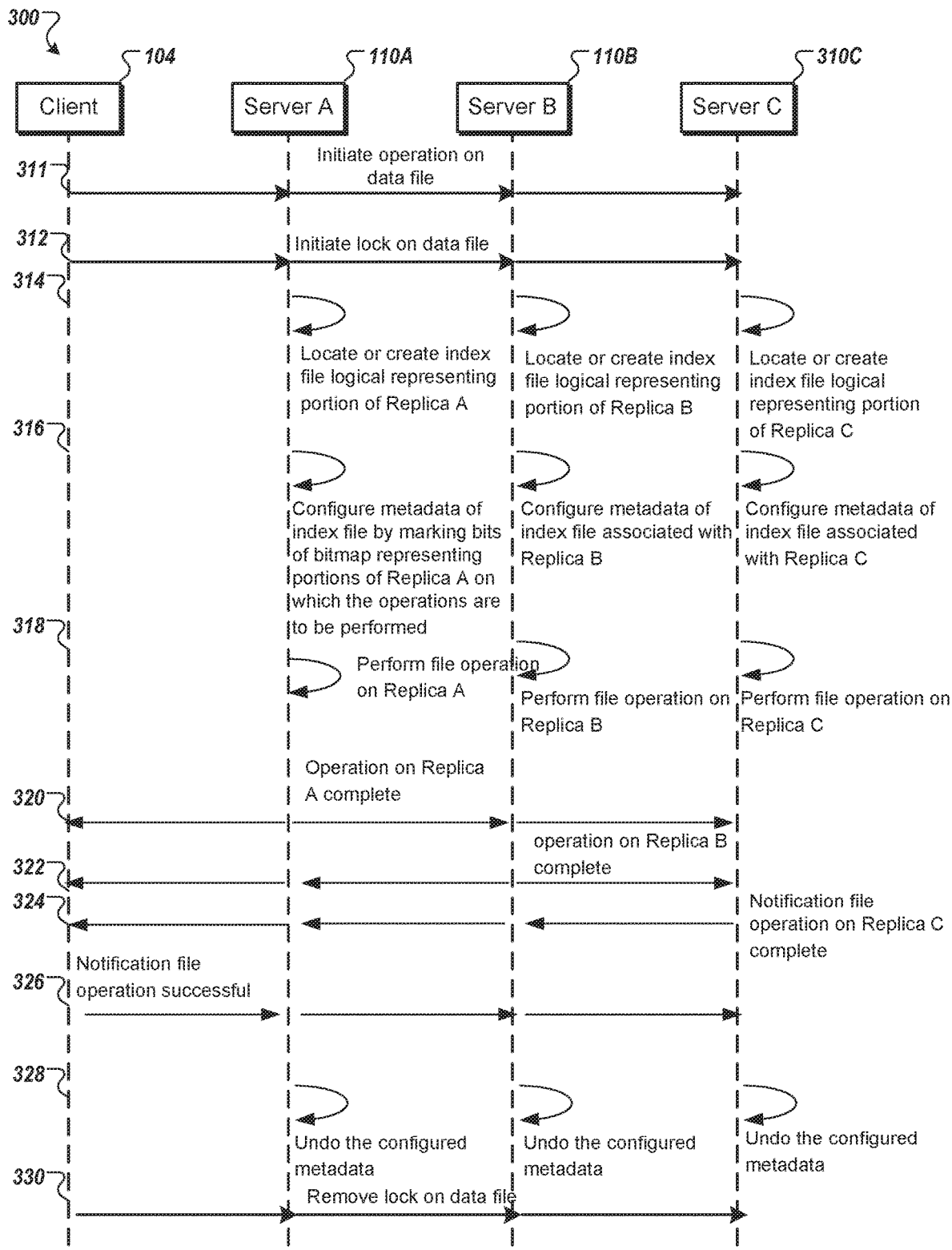
FIG. 3 illustrates a sequence diagram for granular data self-healing in a distributed file system, in accordance with implementations.

FIG. 3 illustrates a sequence diagram for granular data self-healing in a distributed file system, in accordance with implementations. Distributed file system 300 may include client machine 104, storage server 110A, and or storage server 110B as described with respect to FIG. 1. Distributed file system 300 may be similar to distributed file system 102 as described with respect to FIG. 1. Storage server 310C may be the same or similar as storage server 110A or storage server 110B as described with respect to FIG. 1. It should be appreciated that the sequence of operations is provided for purposes of illustration, rather than limitation. For example, distributed file system 300 may perform the operations in any order and may include some, all, or more operations than those described with respect to FIG. 3. It should also be appreciated that although storage server 110A, storage server 110B, and storage server 310C are described performing the operations, the respective storage servers and or the corresponding granular data self-healing managers and or client machine 104 may perform all or some of the operations. In one implementation, the operations described as being performed by the storage servers may be performed by the respective granular data self-healing managers.

At 311, client machine 104 initiates an operation on a data file. In one implementation, client machine 104 may send a request to perform an operation on a data file to distributed file system 102. Client machine 104 may send an operation request to storage server 110A to perform the operation on replica A of the data file, an operation request to storage server 110B to perform the operation on replica B of the data file, and or an operation request to storage server 310C to perform the operation on replica C of the data file.

At 312, client machine 104 may send a lock request to distributed file system 102 to lock the data file. For example, client machine 104 may send a lock request to storage server 110A to lock replica A, to storage server 110B to lock replica B, and or to storage server 310C to lock replica C. A lock on a data file may refer to the ability of client machine 104 or distributed file system 102 to restrict access to the data file. The requested operation of 311 may be performed when access is restricted in response to the lock request. A lock may restrict access of users, VMs, client machines, processes, or the like, to perform additional operations to the data file.

At 314, in response to the operation request and using indicators of the operation request, storage server 110A identifies (e.g., locates) one or more index files that logically represent portions of replica A on which the operation is to be performed. If the corresponding index files are not identified, storage server 110A may create one or more index files. Similarly, storage server 110B may perform similar operations on replica B in response to the operation request and storage server 110C may perform similar operations on replica C in response to the operation request. In one example, storage server 110A determines the index file by attempting to locate the index file using a UUID associated with the file. The UUID may be associated or determined from the indicators of the operation request. For example, the length indicator and offset indicator may be used to determine the corresponding segment of replica A on which the operation is to be performed. The UUID may be derived from the corresponding segment or be linked in a table, for example. If the index file is not located using the UUID, storage server 110A may create the index file and associate the index file with the UUID. Storage server 110B and storage server 310C may perform similar operations.

At 316, storage server 110A configures the metadata of the identified or created index files by modifying the bits (e.g., from logical "0" to logical "1") of the bitmap associated with the index file. The modified bits of the bitmap may represent the specific portions of replica A on which the operations are to be performed. Similarly, storage server 110B may perform similar operations on replica B in response to the operation request and storage server 110C may perform similar operations on replica C in response to the operation request.

At 318, storage server 110A performs the operation on replica A, storage server 110B performs the operations on replica B, and or storage server 310C performs the operations on replica C. At 320 storage server 110A sends an indication to client machine 104, storage server 110B, and or storage server 310C that the operation on replica A has been completed. At 322, storage server 110B sends an indication to client machine 104, storage server 110A, and or storage server 310C that the operation on replica B has been completed. At 324, storage server 310C sends an indication to client machine 104, storage server 110A, and or storage server 110B that the operation on replica C has been completed.

At 326, client machine 104 sends an indication to storage server 110A, storage server 110B, and or storage server 310C that the operation has been successfully performed on all the replicas. At 328, in response to the indication that the operation has been successfully performed, storage server 110A undoes the modification to the metadata. For example storage server 110A returns the metadata to an unmodified state, by returning all the bits of the bitmap to logical "0." Storage server 310B may perform similar operations in response to the indication from client machine 104 and storage server 310C may perform similar operation in response to the indication from client machine 104. At 330, client machine 104 removes the lock on replica A of storage server 110A, replica B of storage server 110B, and or replica C of storage server 310C.

Figure 4:
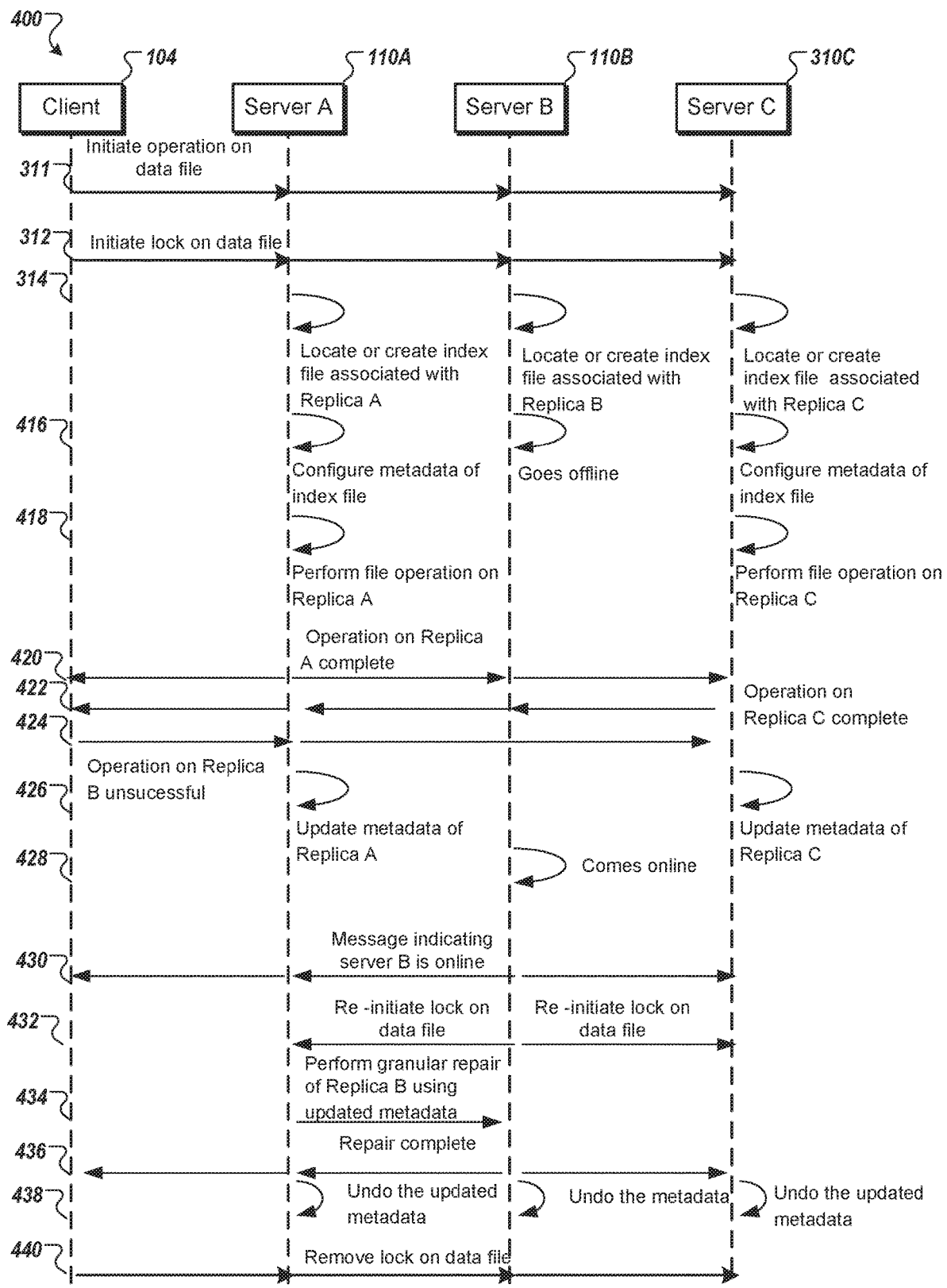
FIG. 4 illustrates another sequence diagram for granular data self-healing in a distributed file system, in accordance with implementations.

FIG. 4 illustrates another sequence diagram for granular data self-healing in a distributed file system, in accordance with implementations. Distributed file system 400 may include client machine 104, storage server 110A, and or storage server 110B as described with respect to FIG. 1. Distributed file system 400 may be similar to distributed file system 102 as described with respect to FIG. 1. Storage server 310C may be the same or similar as storage server 110A or storage server 110B as described with respect to FIG. 1. It should be appreciated that the sequence of operations is provided for purposes of illustration, rather than limitation. For example, distributed file system 400 may perform the operations in any order and may include some, all, or more than the operations described with respect to FIG. 4. It should also be appreciated that although storage server 110A, storage server 110B, and storage server 310C are described performing the operations, the respective storage servers and or the corresponding granular data self-healing managers and or client machine 104 may perform all or some of the operations. In one implementation, the operations described as performed by the storage servers may be performed by their respective granular data self-healing managers.

At 311, client machine 104 initiates an operation on a data file. At 312, client machine 104 may send a lock request to distributed file system 102 to lock the data file. At 314, in response to the operation request and using indicators of the operation request, storage server 110A identifies (e.g., locates) one or more index files that logically represent the portions of replica A on which the operation is to be performed. 311, 312, 314 are further described with respect to FIG. 3.

At 416, storage server 110A configures the metadata of the identified or created index files by modifying the bits (e.g., from logical "0" to logical "1") of the bitmap associated with the index file. The modified bits of the bitmap may represent the specific portions of replica A on which the operations are to be performed. Similarly, storage server 110C may perform similar operations on replica C in response to the operation request. Storage server 110B goes offline and is not able to configure the metadata of replica B.

At 418, storage server 110A performs the operation on replica A and or storage server 310C performs the operations on replica C. Since storage server 110B is offline, storage server 110B is unable to perform the operation on replica B and replica B is in an outdated state.

At 420 storage server 110A sends an indication to client machine 104, storage server 110B, and or storage server 310C that the operation on replica A has been completed. At 422, storage server 310C sends an indication to client machine 104, storage server 110A, and or storage server 110B that the operation on replica C has been completed. At 424, client machine determines that storage server 110B has not completed the operation on replica A. For example, client machine 104 does not receive a message from storage server 110B that the operation has been completed on replica B within a threshold amount of time. In response to determining that storage server 110B has not completed the operation on replica B, client machine 104 sends an indication, such as a message, to storage server 110A and or storage server 110B that the operation on replica B was unsuccessful.

At 426, storage server 110A updates the metadata of the index files associated with replica A by marking (or re-marking) the bits of the bitmap representing the portions of replica A that have been modified. Storage server 310C may perform similar operations on replica C. In some implementations, 426 is a confirmation operation to confirm that the configured metadata of 416 is correct and or up-to-date after the operation has been performed. The metadata may be updated to indicate the specific portions of the replica that have been modified. A similar step may be implemented in distributed file system 300 of FIG. 3.

At 428, storage server 110B comes back online. Storage server 110B was not able to perform the operation on replica B making replica B outdated.

At 430, the storage server 110A and or storage server 310C may determine that replica B of storage server 110B in an outdated state. In one implementation, in response to coming online, storage server 110B may send an indication, such as a message, to client machine 104, storage server 110A, and or storage server 310C indicating that storage server 110B has come back online and replica B is in an outdated state. In another implementation, client machine 104 may send an indication, such as a message, to storage server 110A and or storage server 310C that storage server 110B is back online and replica B is in an outdated state.

In another implementation, the distributed file system 400 implements a heartbeat mechanism (not shown) among the storage servers (e.g., storage server 110A, storage server 110B, and or storage server 310C) within the distributed file system 400. All the storage servers within the distributed file system 400 can use the heartbeat mechanism to communicate their status and can do so periodically. For example, when storage server 110A receives an indication, such as a heartbeat message, from storage server 110B, storage server 110A can determine that the storage server 110B is online. When the storage server 110A stops receiving heartbeat messages from storage server 110B and a condition has been met (e.g., a threshold period of time has elapsed), then the storage server 110A can determine that the storage server 110B is offline. When storage server 110B comes back online, storage server 110A may receive a heartbeat message and begin repairing replica B on storage server 110B. In other implementations, the client machine 104 can receive and transmit the heartbeat messages of the distributed file system 400.

At 432, storage server 110B re-initiates a lock on the data file. Storage server 110B may send an indication, such as a message, to storage server 110A to lock replica A and or an indication to storage server 310C to lock replica C. Alternatively, client machine 104 may send an indication to storage server 110A and or storage server 310C to lock the respective replicas of the data file.

At 434, storage server 110A performs granular repair of outdated replica B using current replica A. Alternatively, storage server 310C may perform the granular repair of outdated replica B. In one implementation, storage server 110A determines the segments and portions of each segment that have been changed responsive to completing the operation on replica A by looking at the metadata of the index files associated with replica A. For example, storage server 110A may determine that bits of bitmap that are logical "1" identify the portions of replica A on which the operation has been performed. In one implementation, storage server 110A may compare the metadata of the index files associated with replica A with the metadata data of the index file associated with replica B to determine the specific portions of replica B that are outdated and are to be updated. Storage server 110A may update the specific portions of replica B using replica A. In another implementation, storage server 110A may determine that bits of bitmap that are logical "1" identify the portions of replica A on which the operation has been performed and modify the corresponding portions of replica B without comparing metadata.

At 436, storage server 110B may send a confirmation message to storage server 110A, storage server 310C, and or client machine 104 that the repair of replica B is complete. At 438, storage server 110A may configure the metadata of the index files associated with replica A to an original state, e.g., return all the bits of the bitmap to logical "0." Storage server 110B may configure the metadata of the index files associated with replica B to an original state. Storage server 110C may configure the metadata of the index files associated with replica C to an original state. At 440, client machine 104 sends a message to storage server 110A, storage server 110B, and or storage server 310C to remove the lock on the respective replicas of the data file.

Figure 5:
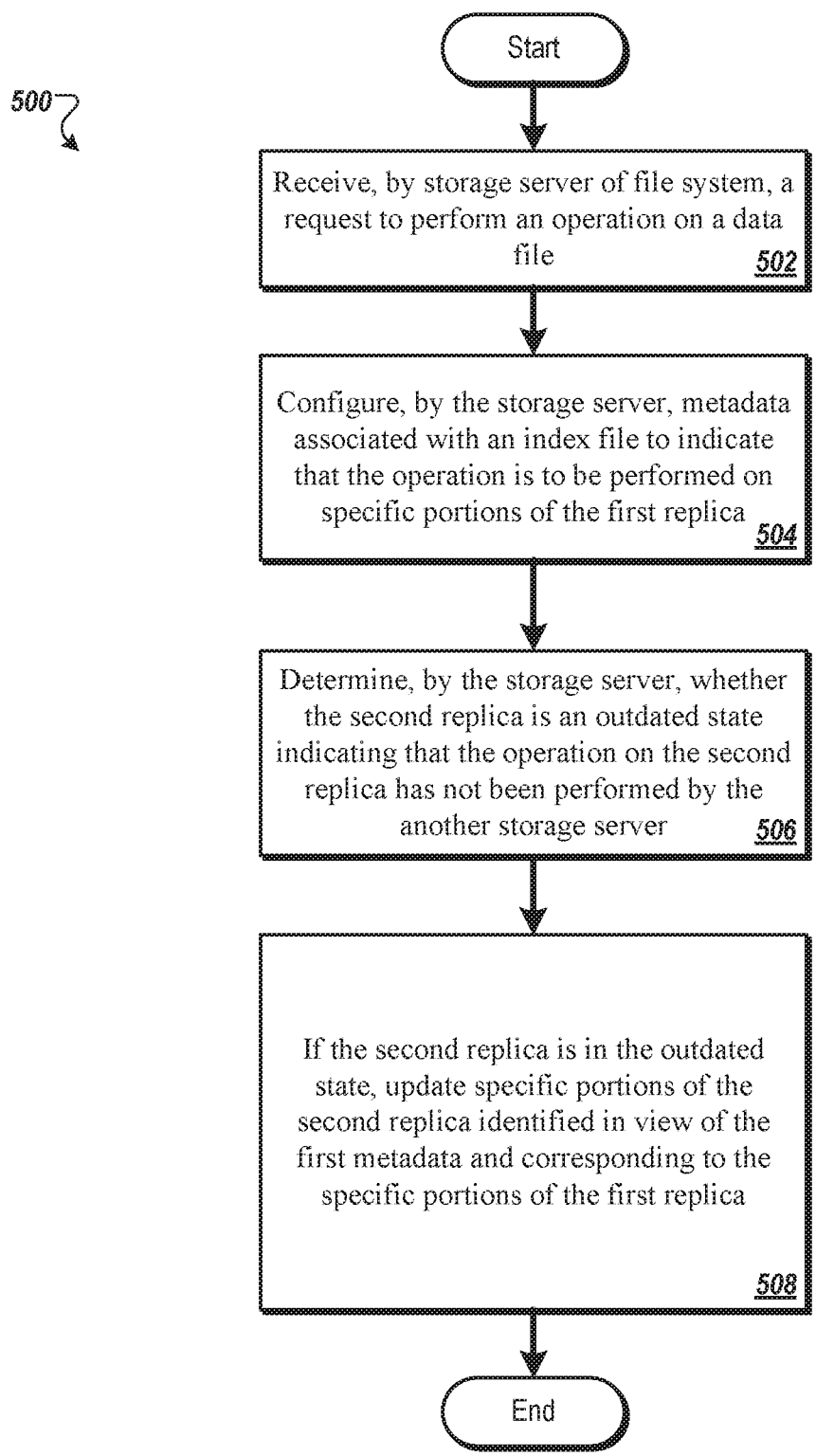
FIG. 5 illustrates a flow diagram of for granular data self-healing in a distributed file system, in accordance with implementations.

FIG. 5 illustrates a flow diagram of for granular data self-healing in a distributed file system, in accordance with implementations. Method 500 can be performed by processing logic (e.g., in computing system 600 of FIG. 6) that may comprise hardware (e.g., circuitry, dedicated logic, programmable logic, microcode, etc.), software (such as instructions run on a processing device), firmware, or a combination thereof. In one implementation, method 500 is performed primarily by client machine 104 of FIG. 1. In other implementations, method 500 is performed primarily by a storage server 110 of FIG. 1. In another implementation, method 500 is performed primarily by a granular data self-healing manager 120 of FIG. 1. For purposes of illustration and not limitation, the following description uses the system architecture 100 for describing the method 500. However, another system architecture, or combination of system architectures, may be used to perform the method 500.

Method 500 begins at block 502 where processing logic implementing the method on storage server 110A of distributed file system 102, receives a request to perform an operation on a data file. In one example, storage server 110A receives a request to perform an operation on replica A of the data file. At block 504, processing logic configures the metadata associated with an index file to indicate that the operation is to be performed on specific portions of replica A. At block 506, processing logic determines whether the replica B is in an outdated state indicating that the operation on replica B has not been performed by storage server 110B. At block 508, if replica B is in an outdated state, processing logic updates specific portions of the second replica in view of the metadata of the index files associated with replica A.

Figure 6:
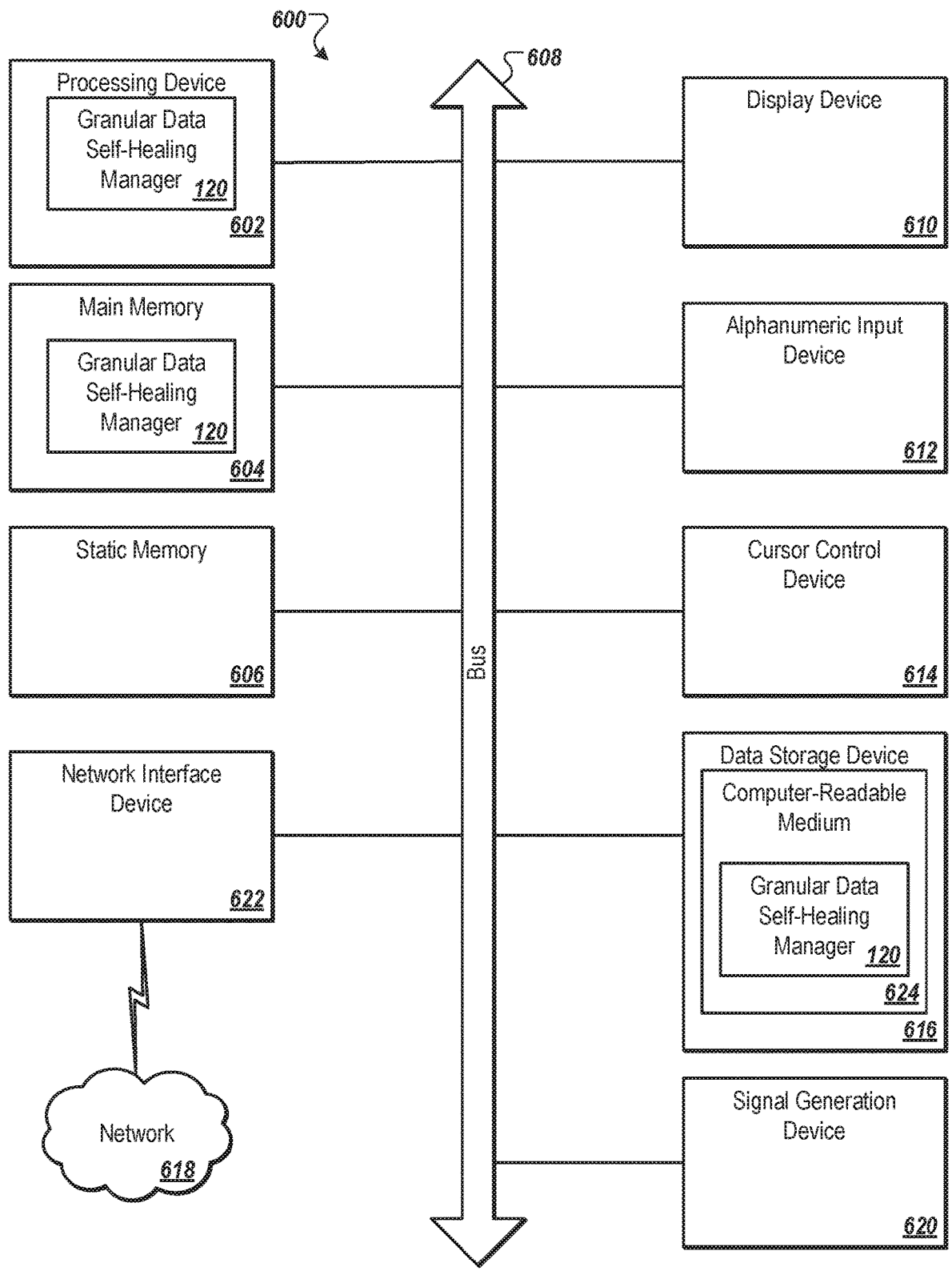
FIG. 6 illustrates an example machine of a computer system within which a set of instructions, for causing the machine to perform any one or more of the methodologies discussed herein, may be executed.

FIG. 6 illustrates an example machine of a computer system 600 within which a set of instructions, for causing the machine to perform any one or more of the methodologies discussed herein, may be executed. In alternative implementations, the machine (e.g., computer system 600) may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 608.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute granular data self-healing manager 120 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). The data storage device 616 may include a machine-readable storage medium 624 (also known as a computer-readable medium) on which is stored one or more sets of instructions or software to execute granular data self-healing manager 120 embodying any one or more of the methodologies or functions described herein. The to execute granular data self-healing manager 120 may also reside, completely or at least partially, within the main memory 604 and/or within the processing device 602 during execution thereof by the computer system 600, the main memory 604 and the processing device 602 also constituting machine-readable storage media.

In one implementation, granular data self-healing manager 120 includes instructions for a pro-active self-healing module and/or a software library containing methods that call modules in a pro-active self-healing module. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "locating" or "determining" or "self-healing" or "examining" or "comparing" or "acquiring" or "providing" or "receiving" or "updating" or "setting" or "removing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving, by a first storage server of a file system, a request to perform an operation that changes data of a data file, wherein a corresponding operation is to be performed on a first replica of the data file stored at the first storage server and a second replica of the data file stored at a second storage server of the file system, wherein the first replica is associated with a plurality of index files that logically represent a plurality of segments of the first replica, wherein a first index file of the plurality of index files logically represents a first segment of the plurality of segments and is associated with first metadata that further logically represents a plurality of portions of the first segment of the first replica;
responsive to receiving the request to perform the operation, configuring, by the first storage server, the first metadata associated with the first index file to indicate that the corresponding operation that changes data of the first replica is to be performed on a first portion of the plurality of portions of the first segment of the first replica, and wherein the first metadata of the first index file indicates at which of the plurality of portions of the first segment of the first replica the corresponding operation is to be performed;
determining, by the first storage server, the second replica is in an outdated state indicating that the operation on the second replica has not been performed by the second storage server; and
responsive to the second replica being in the outdated state, updating a first portion of the second replica identified in view of the first metadata and corresponding to the first portion of the first replica.

2. The method of claim 1, further comprising:
performing the corresponding operation on the first replica of the data file stored at the first storage server;
receiving an indication that the corresponding operation on the second replica of the data file stored at the second storage server has been performed; and
responsive to the first replica and the second replica being in a current state, configuring the first metadata to an original state, wherein the current state of the first replica indicates that the corresponding operation has been performed on the first replica.

3. The method of claim 1, further comprising:
performing the corresponding operation on the first replica of the data file stored at the first storage server;
updating, by the first storage server, the first metadata of the first index file to indicate the first portion of the first replica that has been modified;

receiving, by the first storage server, an indication that the second replica of the data file stored at the second storage server is in the outdated state; and updating the first portion of the second replica identified in view of the updated first metadata.

4. The method of claim 3, further comprising:

subsequent to updating the first portion of the second replica, configuring the first metadata associated with the first replica to an original state.

5. The method of claim 1, further comprising:

determining, by the first storage server in view of the request, the first index file associated with the first replica using an offset indicator and a length indicator contained in the request, wherein the offset indicator and the length indicator to identify one or more bit ranges of the data file on which the operation is to be performed.

6. The method of claim 5, wherein the determining the first index file associated with the first replica comprises:

locating the first index file using a universally unique identifier (UUID) associated with the first index file; and if the first index file is not located using the UUID, creating the first index file and associating the first index file with the UUID.

7. The method of claim 1, wherein the first metadata associated with the first index file comprises a bitmap, and wherein configuring the first metadata associated with the first index file comprises:

modifying a bit of a plurality of bits of the bitmap to indicate that the corresponding operation is to be performed on the first portion of the first replica, wherein the plurality of bits of the bitmap logically represent the plurality of portions of the first segment of the first replica.

8. The method of claim 1, further comprising:

receiving, by the first storage server from a client machine, a lock on the first replica of the data file to prevent additional operations to be performed on the first replica.

9. A system comprising: a memory; and a processing device, coupled to the memory, to:

determine, by a first storage server, a second replica of a data file associated with a second storage server is in an outdated state, the outdated state indicating that an operation on the second replica has not been performed by the second storage server, wherein the operation has been performed on a first replica of the data file stored at the first storage server in response to receiving a request to perform the operation on the data file, wherein the first replica is associated with a plurality of index files that logically represent a plurality of segments of the first replica, wherein a first index file of the plurality of index files logically represents a first segment of the plurality of segments and is associated with first metadata that further logically represents a plurality of portions of the first segment of the first replica;

determine, by the first storage server, a first portion of the plurality of portions of the first replica on which the operation has been performed using the first metadata associated with a first index file, wherein the first metadata has been configured to indicate that the operation that changes data of the first replica has been performed on the first portion of the plurality of portion of the first segment of the first replica, wherein the first metadata of the first index file indicates at which of the plurality of portion of the first segment of the first replica the operation has been performed; and responsive to the second replica being in the outdated state, update a first portion of the second replica identified in view of the first metadata and corresponding to the first portion of the first replica.

10. The system of claim 9, the processing device further to:

perform the operation on the first replica of the data file stored at the first storage server;

receive an indication that the operation on the second replica of the data file stored at the second storage server has been performed; and responsive to determining that the first replica and the second replica are in a current state, configure the first metadata to an original state, wherein the current state of the first replica indicates that the operation has been performed on the first replica.

11. The system of claim 9, the processing device further to:

perform the operation on the first replica of the data file stored at the first storage server;

update, by the first storage server, the first metadata of the first index file to indicate the first portion of the first replica has been modified;

receive, by the first storage server, an indication that the second replica of the data file stored at the second storage server is in the outdated state; and update the first portion of the second replica identified in view of the updated first metadata.

12. The system of claim 11, the processing device further to:

subsequent to updating the first portion of the second replica, configure the first metadata to an original state.

13. The system of claim 9, the processing device further to:

receive, by the first storage server of the file system, a request to perform the operation on the data file, wherein the operation is to be performed on the first replica of the data file stored at the first storage server and the second replica of the data file stored at the second storage server of the file system; and determine, by the first storage server in view of the request, the first index file associated with the first replica using an offset indicator and a length indicator contained in the request, wherein the offset indicator and the length indicator identify one or more bit ranges of the data file on which the operation is to be performed.

14. The system of claim 13, wherein to determine the first index file associated with the first replica, the processing device further to:

locate the first index file using a universally unique identifier (UUID) associated with the first index file; and if the first index file is not located using the UUID, create the first index file and associating the first index file with the UUID.

15. The system of claim 9, the processing device further to:

configure the first metadata associated with the first index file to indicate that the operation is to be performed on the first portion of the first replica.

16. A non-transitory computer-readable medium comprising instruction that, when executed by a processing device, cause the processing device to:

receive, by the processing device of a first storage server of a file system, a request to perform an operation that changes data of a data file, wherein a corresponding operation is to be performed on a first replica of the data file stored at the first storage server and a second replica of the data file stored at a second storage server of the file system, wherein the first replica is associated with a plurality of index files that logically represent a plurality of segments of the first replica, wherein a first index file of the plurality of index files logically represents a first segment of the plurality of segments and is associated with first metadata that further logically represents a plurality of portions of the first segment of the first replica;

responsive to receiving the request to perform the operation, configure, by the first storage server, the first metadata associated with the first index file to indicate that the corresponding operation that changes data for the first replica is to be performed on a first portion of the plurality of portions of the first segment of the first replica, and wherein the first metadata of the first index file indicates at which of the plurality of portions of the first segment of the first replica the corresponding operation is to be performed;

determine, by the first storage server, the second replica is in an outdated state indicating that the operation on the second replica has not been performed by the second storage server; and responsive to the second replica being in the outdated state, update a first portion of the second replica identified in view of the first metadata and corresponding to the first portion of the first replica.

17. The non-transitory computer-readable medium of claim 16, the processing device further to:

perform the corresponding operation on the first replica of the data file stored at the first storage server;

receive an indication that the corresponding operation on the second replica of the data file stored at the second storage server has been performed; and responsive to the first replica and the second replica being in a current state, configure the first metadata to an original state, wherein the current state of the first replica indicates that the corresponding operation has been performed on the first replica.

18. The non-transitory computer-readable medium of claim 16, the processing device further to:

subsequent to updating the first portion of the second replica, configure the first metadata to an original state.

19. The non-transitory computer-readable medium of claim 16, the processing device further to:

determine, by the first storage server in view of the request, the first index file associated with the first replica using an offset indicator and a length indicator contained in the request, wherein the offset indicator and the length indicator identify one or more bit ranges of the data file on which the operation is to be performed.

20. The non-transitory computer-readable medium of claim 16, wherein the first metadata associated with the first index file comprises a bitmap, wherein to configure the first metadata associated with the first index file, the processing device further to:

modify a bit of a plurality of bits of the bitmap to indicate that the corresponding operation is to be performed on the first portion of the first replica, wherein the plurality of bits of the bitmap logically represent the plurality of portions of the first segment of the first replica.

* * * * *